(12) United States Patent
Mibu

(10) Patent No.: US 10,107,636 B2
(45) Date of Patent: Oct. 23, 2018

(54) NAVIGATION SYSTEM AND NAVIGATION PROGRAM

(71) Applicant: Yosuke Mibu, Iida (JP)

(72) Inventor: Yosuke Mibu, Iida (JP)

( * ) Notice: Subject to any disclaimer, the term of this patent is extended or adjusted under 35 U.S.C. 154(b) by 0 days.

(21) Appl. No.: 15/507,153

(22) PCT Filed: Nov. 18, 2016

(86) PCT No.: PCT/JP2016/084356
§ 371 (c)(1),
(2) Date: Feb. 27, 2017

(87) PCT Pub. No.: WO2017/163484
PCT Pub. Date: Sep. 28, 2017

(65) Prior Publication Data
US 2018/0164116 A1    Jun. 14, 2018

(30) Foreign Application Priority Data
Mar. 22, 2016   (JP) .................. 2016-056834

(51) Int. Cl.
*G01C 21/36* (2006.01)
*G01C 21/26* (2006.01)
(Continued)

(52) U.S. Cl.
CPC ....... *G01C 21/3608* (2013.01); *G01C 21/005* (2013.01); *G01C 21/26* (2013.01);
(Continued)

(58) Field of Classification Search
CPC ........ G09B 29/00; G09B 29/10; G01C 21/26; G01C 21/34; G01C 21/3608;
(Continued)

(56) References Cited

U.S. PATENT DOCUMENTS 7,076,741 B2 * 7/2006 Miyaki .............. G01C 21/3664
715/712
2008/0162031 A1 * 7/2008 Okuyama ............ G01C 21/367
701/532
(Continued)

FOREIGN PATENT DOCUMENTS

JP    H10-089976 A    4/1998
JP    2001-091273 A    4/2001
(Continued)

*Primary Examiner* — Rachid Bendidi
(74) *Attorney, Agent, or Firm* — Studebaker & Brackett PC

(57) ABSTRACT

It makes easy to grasp detailed information on a POI on a map. A navigation system according to the invention is configured to display a POI icon on a map, which the navigation system includes: a storage that stores POI information and voice data in association with each other; a reproducing part configured to, upon a selection of the POI icon displayed on the map, reproduce the voice data associated with the POI information of the POI icon; a recording part configured to record new voice data; and a posting part configured to cause the storage to store the POI information of the selected POI icon and the new voice data in association with each other.

5 Claims, 15 Drawing Sheets

(51) Int. Cl.
*G09B 29/00* (2006.01)
*G09B 29/10* (2006.01)
*G01C 21/00* (2006.01)
*G06F 3/0481* (2013.01)
*G06F 3/16* (2006.01)
*G10L 25/48* (2013.01)

(52) U.S. Cl.
CPC ..... *G01C 21/3617* (2013.01); *G06F 3/04817* (2013.01); *G06F 3/167* (2013.01); *G09B 29/00* (2013.01); *G09B 29/10* (2013.01); *G10L 25/48* (2013.01)

(58) Field of Classification Search
CPC .............. G01C 21/005; G01C 21/3617; G08G 1/0969; G06F 17/30; G06F 3/167; G06F 3/04817; G10L 25/48
See application file for complete search history.

(56) References Cited

U.S. PATENT DOCUMENTS

| | | | | |
|---|---|---|---|---|
| 2008/0189032 A1* | 8/2008 | Beadman | ............... | G01C 21/26 701/532 |
| 2010/0333124 A1* | 12/2010 | Folgner | ................... | H04H 60/33 725/13 |
| 2012/0185889 A1* | 7/2012 | Folgner | ................... | H04H 60/33 725/13 |
| 2013/0096966 A1* | 4/2013 | Barnes, Jr. | ......... | G06Q 10/1053 705/5 |
| 2013/0268892 A1* | 10/2013 | Schaaf | ................. | G01C 21/367 715/830 |
| 2014/0244110 A1* | 8/2014 | Tharaldson | ............ | G07C 5/008 701/36 |
| 2015/0012555 A1* | 1/2015 | Ishiguro | ............ | G06F 17/30528 707/758 |

FOREIGN PATENT DOCUMENTS

| | | |
|---|---|---|
| JP | 2009-116370 A | 5/2009 |
| JP | 2012-063900 A | 3/2012 |
| JP | 2013-120317 A | 6/2013 |
| JP | 2013-228228 A | 11/2013 |
| JP | 2014-135026 A | 7/2014 |
| JP | 2015-014859 A | 1/2015 |
| JP | 2015-069258 A | 4/2015 |
| JP | 2015-225128 A | 12/2015 |

* cited by examiner

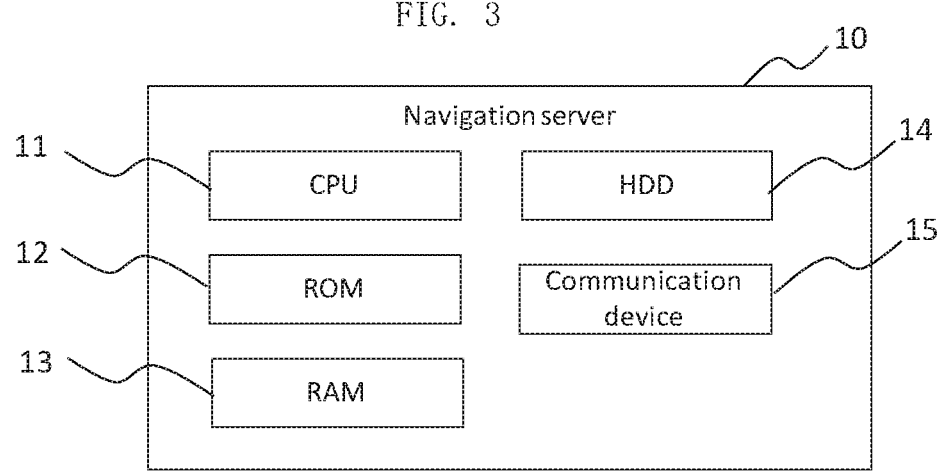
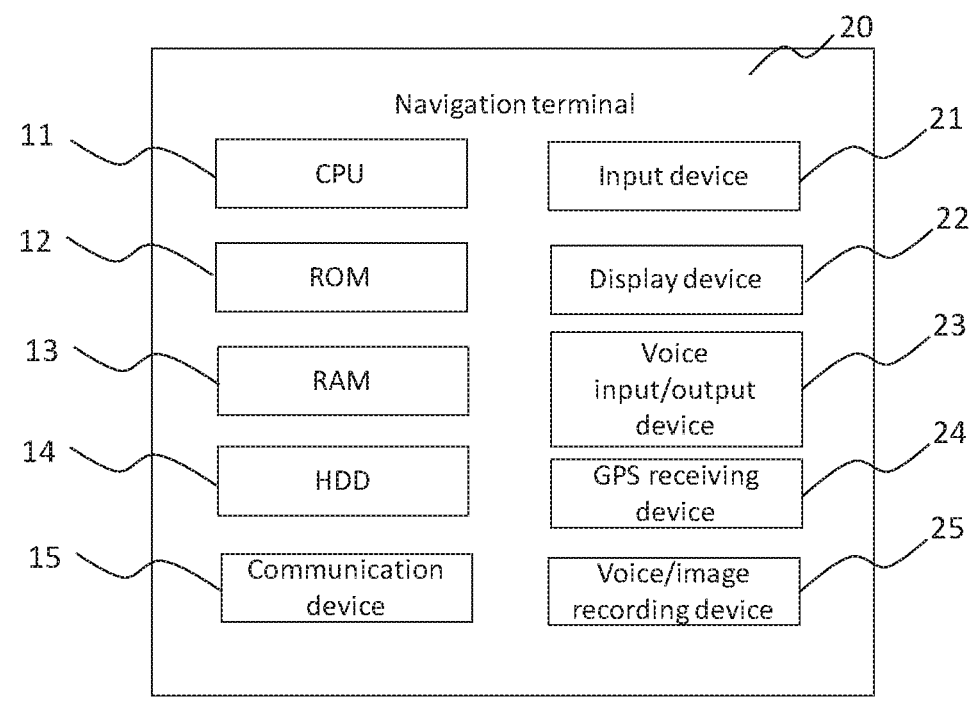
FIG. 3

FIG. 5

POI information DB

| ID | Position coordinates | POI name | POI genre | Registraion data | Registration date | Evaluation |
|---|---|---|---|---|---|---|
| N001 | (x1,y1) | RrestaurantA | Restaurants | N001.mp3 | 2016/3/1 | 3.8 |
| N002 | (x2,y2) | Castle ruins | Sightseeing spot | N002.mp3 | 2015/12/11 | 4.1 |
| N003 | (x3,y3) | Bgas | Gas stations | N003.mpg | 2016/2/16 | 2.3 |
| N004 | (x4,y4) | JapaneseC | Restaurants | N004.mpg | 2016/2/3 | 3.4 |
| N005 | (x5,y5) | Dplayground | | N005.mpg | 2016/2/27 | 2.7 |
| : | | | | | | |

ID:N001

| Posting data No | Posting data | Posting userID | Public range |
|---|---|---|---|
| 1 | N001-1.mp3 | taro002 | 1 |
| 2 | N001-2.mp3 | hanako | 0 |
| 3 | N001-3.mpg | takeshi | 1 |

ID:N002

| Posting file No | Posting file | Posting userID | Public range |
|---|---|---|---|
| 1 | N002-1.mp3 | jiro | 1 |
| 2 | N002-2.mp3 | tanaka123 | 2 |

0:private  1:published  2:limitedly published

FIG. 6

New registration screen

ID : N001

Position coordinates : X1 , y1

POI name : Restaurant A

POI genre : ▽ Restaurant

Registration data : N001.mp3  Reference

Registration  Reset

NAVIGATION SYSTEM AND NAVIGATION PROGRAM

TECHNICAL FIELD

The present invention is related to a navigation system and a navigation program.

BACKGROUND ART

Conventionally, a navigation system is known in which a so-called POI (Point of Interest) such as a desired shop etc. (a restaurant, a convenience store, a gas station, a sightseeing spot, etc.) is displayed on a map or on a search route.

As a technique relating to this, for example, Japanese Laid-Open Patent Publication No. 2004-309887 discloses a car navigation terminal automatic advertisement system that determines the location of a specific facility to be advertised on a map of basic map information, and has a color tone display section with a logo mark or a title of a specific facility at a location on the basic map intermittently and repeatedly changed to be highlighted, or enables the location to be emphasized and guided by an auditory means such as a melody.

CITATION LIST

Patent Literature 1

[PTL 1] Japanese Laid-Open Patent Publication No. 2001-091273

SUMMARY

Technical Problem

However, in the invention described in Patent Document 1, only the shops, etc., on the map or the search route are highlighted, and even reputation such as what kind of merchandise is specifically handled and whether it is a delicious shop or the like cannot be grasped. For this reason, it is necessary for users to actually confirm by them themselves, for example, by entering the store or the like.

The present invention has been made in view of the above points, and it is an object of one aspect to make it possible to easily grasp detailed information on a POI on a map in a navigation system.

Solution to Problem

In order to solve the above problem, a navigation system configured to display a POI icon on a map, the navigation system includes:
a storage that stores POI information and voice data in association with each other;
a reproducing part configured to, upon a selection of the POI icon displayed on the map, reproduce the voice data associated with the POI information of the POI icon;
a recording part configured to record new voice data; and
a posting part configured to cause the storage to store the POI information of the selected POI icon and the new voice data in association with each other.

In order to solve the above problem, a navigation system configured to display a POI icon on a map, the navigation system comprising:
a storage that stores POI information and video data in association with each other;
a reproducing part configured to, upon a selection of the POI icon displayed on the map, reproduce the video data associated with the POI information of the POI icon; a recording part configured to record new video data; and a posting part configured to cause the storage to store the POI information of the selected POI icon and the new video data in association with each other.

Advantageous Effects of Invention

According to the embodiment of the present invention, it is possible to easily grasp detailed information on a POI on a map in a navigation system.

BRIEF DESCRIPTION OF DRAWINGS

FIG. 3 is a diagram illustrating an example of a hardware configuration of a navigation server and a navigation terminal according to the present embodiment.

FIG. 5 is a diagram illustrating an example of data of a POI information DB according to the present embodiment.

FIG. 6 is a diagram illustrating an example of a new registration screen of POI information according to the present embodiment.

DESCRIPTION OF EMBODIMENTS

Embodiments of the present invention will be described in detail with reference to the drawings.

<System Configuration>

Figure 1:
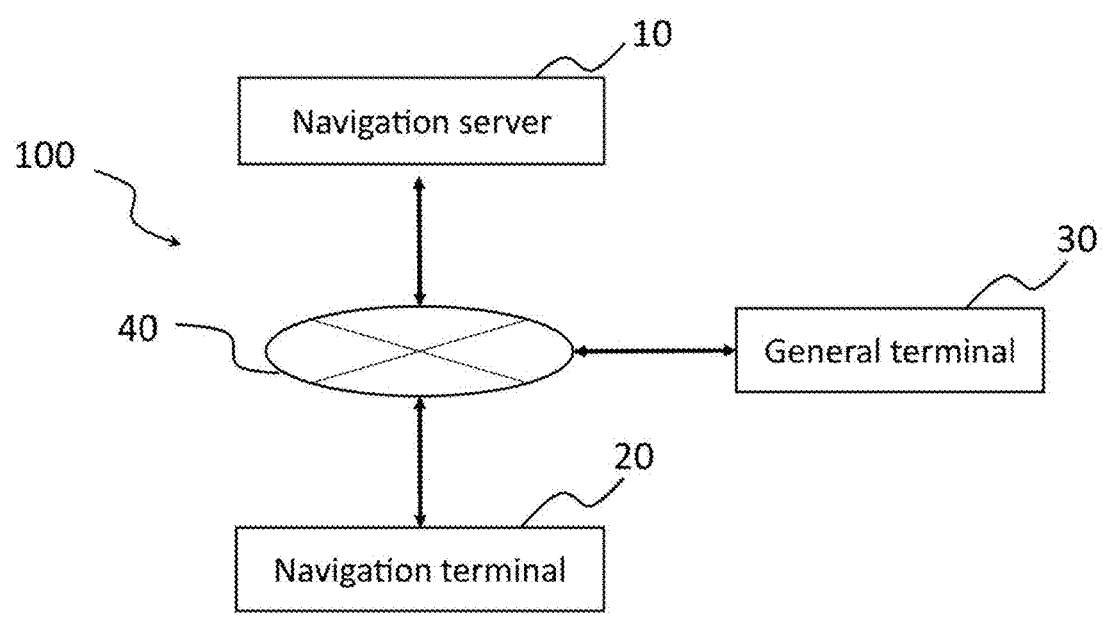
FIG. 1 is a diagram illustrating a configuration example of a navigation system according to an embodiment.

FIG. 1 is a diagram illustrating a configuration example of a navigation system according to the present embodiment. In the navigation system 100 of FIG. 1, a navigation server (hereinafter referred to as a navigation server) 10, a navigation terminal (hereinafter referred to as a navigation terminal) 20, and a general terminal 30 are connected via a network 40.

The navigation server 10 is an information processing device that provides map information in response to a request from the navigation terminal 20 or the general terminal 30. In addition, the navigation server 10 has POI information of various facilities (for example, restaurants, convenience stores, department stores, hotels, gas stations, tourist facilities, etc.) on the map and displays POI icons on the map.

The navigation terminal 20 is a map display terminal used by a user. The navigation terminal 20 is any of a variety of information processing apparatus including, for example, a smartphone, a tablet, mobile phones, car navigation systems (automotive navigation terminal), a notebook PC (Personal Computer), a game machine, a wearable device, etc. The navigation terminal 20 includes a navigation application (hereinafter referred to as a navigation application) and a web browser that communicate with the navigation server 10 and display map information, route information, and the like. The user operates the navigation application or the like of the navigation terminal 20 and displays the map information received from the navigation server 10. Further, when the user inputs a route search condition such as a departure place (or current location) and a destination and transmits it to the navigation server 10, the navigation terminal 20 displays the route information received from the navigation server 10.

The general terminal 30 is a PC terminal used when an owner or the like registers detailed information with respect to POIs on a map.

The network 40 is a communication network including wired and wireless. The network 40 includes, for example, a public line network, the Internet, WiFi (registered trademark), and the like.

Figure 2:
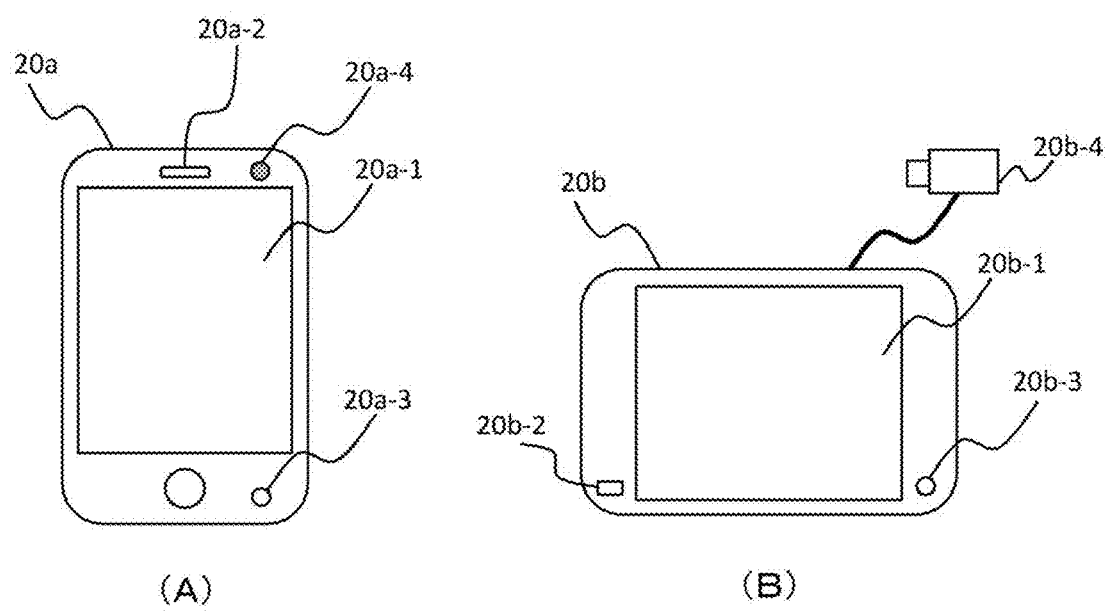
FIG. 2 is a diagram illustrating an example of a navigation terminal according to the present embodiment.

FIG. 2 is a diagram illustrating an example of the navigation terminal according to the present embodiment. As an example of the navigation terminal 20, (A) a smartphone 20a and (B) a car navigation system 20b are illustrated.

The smartphone 20a includes a touch panel type display screen (display) 20a-1, a speaker 20a-2 for outputting voice, a microphone 20a-3 for inputting voice, a camera 20a-4 for capturing an image or video. The smartphone 20a may be a tablet terminal having equivalent functions.

The car navigation system 20b includes a touch panel type display screen (display) 20b-1, a speaker 20b-2 for outputting voice, a microphone 20b-3 for inputting voice, a camera 20b-4 for capturing an image or video. It should be noted that the camera 20b-4 is a so-called in-vehicle camera that images the forward direction of the camera.

<Hardware Configuration>

FIG. 3 is a diagram illustrating an example of the hardware configuration of the navigation server and the navigation terminal according to the present embodiment. As illustrated in FIG. 3, the navigation server 10 includes a CPU (Central Processing Unit) 11, ROM (Read Only Memory) 12, RAM (Random Access Memory) 13, HDD (Hard Disk Drive) 14, a communication device 15.

Further, the navigation terminal 20 has a CPU 11, ROM 12, RAM 13, HDD 14, a communication device 15, an input device 21, a display device 22, a voice input/output device 23, a GPS (Global Positioning System) receiving device 24, and a voice/video recording device 25.

The navigation server 10 and the CPU 11 of the navigation terminal 20 execute various programs and perform arithmetic processing. The ROM 12 stores necessary programs and the like at the time of activation. The RAM 13 is a work area for temporarily storing processing by the CPU 11 and storing data. The HDD 14 stores various data and programs. The communication device 15 communicates with other devices via the network 40.

The input device 21 of the navigation terminal 20 is various input devices such as a keyboard and a mouse, for example. The display device 22 is a display or the like, and displays a map, a POI, or the like. The voice input/output device 23 is, for example, a device configured to input and output voice, including a microphone, a speaker, and the like. The GPS receiving device 24 receives the position information on the current position of the navigation terminal 20 from the GPS satellite.

The voice/video recording device 25 records the voice input from the microphone or the camera, and records the video.

Since the navigation terminal 20 is also, for example, the smartphone 20a and the car navigation system 20b, the input device 21 can be realized by a touch panel capable of detecting the tap coordinates (touch coordinates) on the screen instead of the keyboard and mouse. In this case, the input operation is realized by a touch panel on the screen, a software key controlled by the program, and the like.

<Software Configuration>

Figure 4:
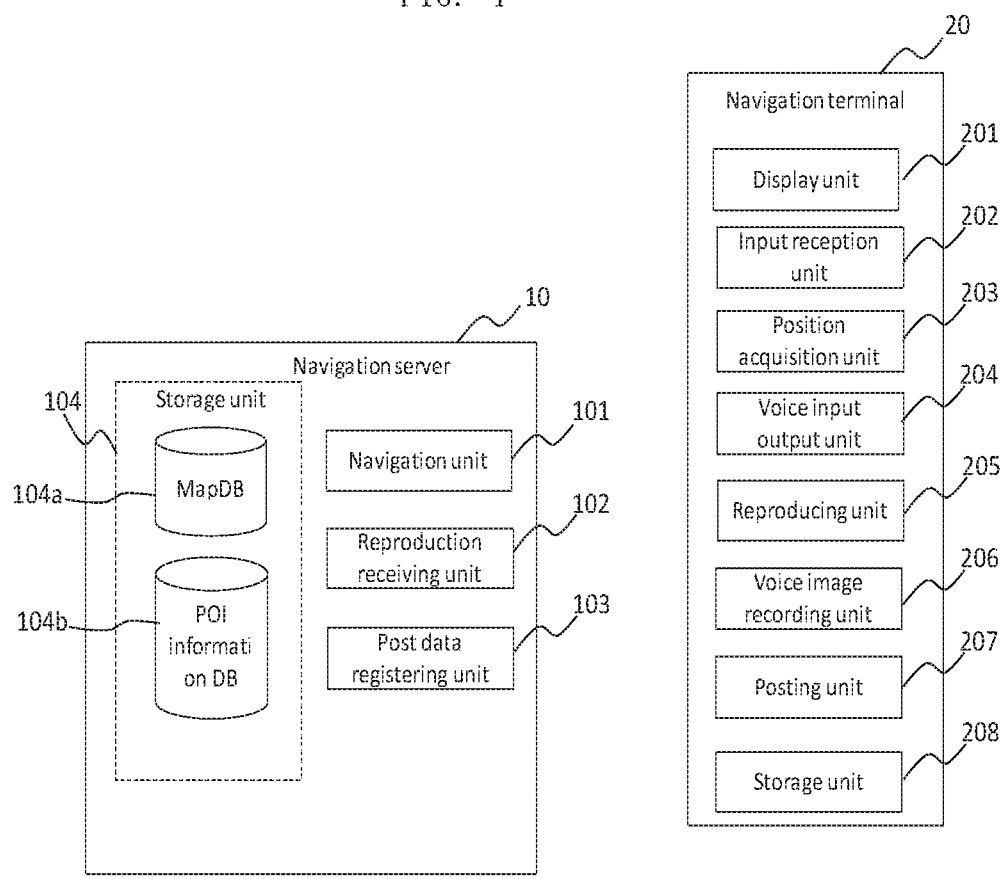
FIG. 4 is a diagram illustrating a software configuration example of a navigation server and a navigation terminal according to the embodiment.

FIG. 4 is a diagram illustrating a software configuration example of the navigation server and the navigation terminal according to the present embodiment.

First, the navigation server 10 includes a navigation unit 101, a reproduction receiving unit 102, a post data registering unit 103, and a storage unit 104 as main functional units.

The navigation unit 101 executes all processing relating to navigation, such as route search according to user input, display of a map, location/display of the POIs, and the like. In executing the navigation processing, the map DB 104 a and the POI information DB 104b of the storage unit 104 are appropriately used as necessary information.

Upon receiving a request to acquire "registration data" such as voice data and video data from the navigation terminal 20, the reproduction receiving unit 102 refers to the POI information DB 104b and transmits (responds) the corresponding "registration data".

When "post data" such as voice data and video data is posted from the navigation terminal 20, the post data registering unit 103 registers "post data" in the POI information DB 104b of the storage unit 104.

The storage unit 104 stores various data used for navigation processing, such as the map DB 104 a and the POI information DB 104b. The map DB 104 stores map information used for navigation. The map information includes, for example, a map (map) displayed on the display screen, roads, signs, natural geography, display components (POI icons) for displaying these on the map, information for route search, etc. The POI information DB 104b stores detailed information (referred to as POI information) on the POI present on the map. Details will be described later.

Next, the navigation terminal 20 includes a display unit 201, an input reception unit 202, a position acquisition unit 203, a voice input/output unit 204, a reproducing unit 205, a voice/image recording unit 206, a posting unit 207, and a storage unit 208.

The display unit 201 displays a map, a search route, display components (POI icons etc.) in the map, and the like on the display screen. The data required for these displays is held on the navigation server 10 side, and is received from the navigation server 10 and displayed. However, some information items such as a basic map or the display components may be previously held on the navigation terminal 20 side.

The input receiving unit 202 receives inputs and operations from the user through a touch panel or the like capable of detecting the tap coordinates (touch coordinates) on the display screen.

The position acquisition unit 203 acquires the position information by receiving the position information of the current position of the navigation terminal 20 from a GPS satellite, performing positioning, or the like.

The voice input/output unit 204 inputs and outputs voice via a microphone, a speaker, or the like, for example.

The reproducing unit 205 reproduces voice data and video data. For example, when a POI icon displayed on the map is selected, the navigation server 10 is requested to acquire voice data and video data associated with the selected POI icon, and the acquired voice data and video data.

The voice/image recording unit 206 records the voice input from the microphone as voice data, and captures and records images and videos input from the camera as image data or video data.

The posting unit 207 posts post data about the POI to the navigation server 10. The post data is voice data recorded by the voice/image recording unit 206 and video data photographed and photographed. Also, posting data may be posted from outside.

The storage unit 208 stores (stores) the recorded voice data, the recorded video data, and the like.

The functional units are realized by a computer program executed on hardware resources such as a CPU, a ROM, and a RAM of computers constituting the navigation server 10 and the navigation terminal 20. These functional units may be replaced with "means", "module", "unit", or "circuit".

(POI Information DB)

FIG. 5 is a diagram illustrating an example of data of the POI information DB according to the present embodiment. The POI information DB 104*b* illustrated in FIG. 5 is a DB in which information relating to the POI is stored, and includes, for example, "ID", "position coordinate", "POI name", "POI genre", "registration data", "registration date and time", "evaluation" and the like.

"ID" indicates a unique identifier to be allocated for each POI. "Position coordinate" indicates the coordinate information where the POI is located. "POI name" indicates the name of the POI. "POI genre" indicates genres to which POI is classified/categorized. "Registration data" indicates voice data or video data for introducing the POI. It is initially registered by the owner of POI, system administrator, etc. "Registration date and time" indicates the registration date and time of "registration data". "Evaluation" indicates the user evaluation value for POI. A plurality of user evaluation values are registered, but here it is assumed that an average value thereof is used.

In the present embodiment, additional posting of voice data and video data for introducing the POI from the user to each POI is possible. Therefore, the POI information DB 104*b* further has data items such as "posting data No.", "posting data", "posting user ID", "disclosure range" in association with each POI.

"Posted data No." indicates a unique number assigned for each item of voice data or video data posted by the user. "Post data" indicates the voice data and video data posted by the user. "Posting user ID" indicates the user ID owned by the user who posted "posting data". User registration is made in advance in order to post the data. "Disclosure range" indicates the disclosure range of "post data". 0 indicates non-disclosure, 1 indicates disclosure, and 2 indicates private disclosure (private disclosure for friends only).

It should be noted that the format of the voice data is not limited to the extension mp3 in FIG. 5, but may be any voice data file such as WAV, AAC, WMA, or the like. Further, the format of the video data is not limited to the extension mpg in FIG. 5, but may be video data file such as AVI, MOV, ASF, or the like.

<Usage Example>

(New Registration of POI Information)

FIG. 6 is a diagram illustrating an example of a new registration screen of POI information according to this embodiment.

When a POI exists on the map, for example, the owner or the like can initially register detailed information with respect to the POI. The owner or the like accesses the new registration screen of the navigation server 10 from the general terminal 30 and inputs and registers data such as "ID", "position coordinate", "POI name", "POI genre", "registration data". Accordingly, corresponding data is input in the POI information DB 104*b* (see FIG. 5).

(Use Screen of Navigation Terminal)

Figure 7:
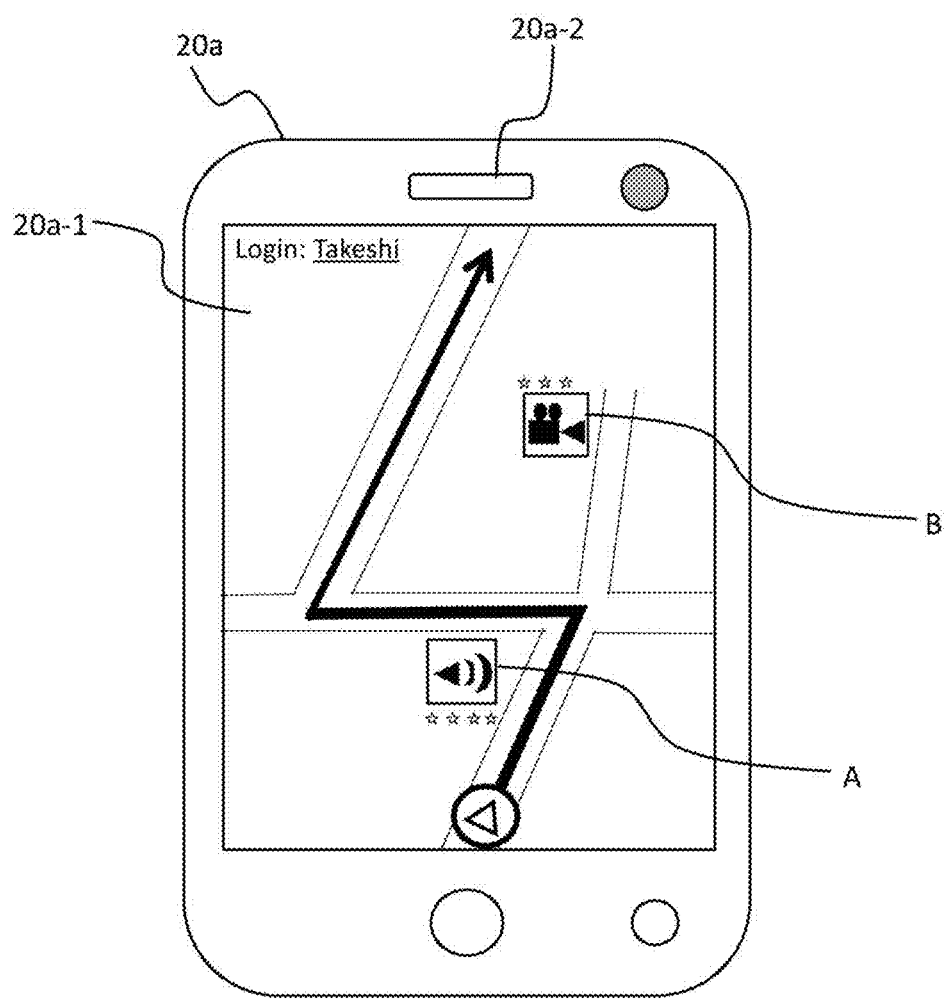
FIG. 7 is a view illustrating a smartphone usage screen example 1 according to the present embodiment.

FIG. 7 is a view illustrating a smartphone usage screen example 1 according to this embodiment. Needless to say, the example of the use screen can be applied to the car navigation system as well (FIG. 2).

As illustrated in FIG. 7, a smartphone 20*a* used by a general user has a touch panel type display screen (display) 20*a*-1, and on the display screen, a road on the map, a current location icon, the search route indicating the arrival route to a destination, etc., as well as a POI icon A and a POI icon B for indicating that there are POIs on the map are displayed.

A voice mark is rendered on the POI icon A, and when the user performs a touch operation, the voice content (voice data) as the POI information is automatically reproduced. In addition, the POI icon B has a video mark rendered thereon, and the user performs a touch operation so that the video content (video data) as the POI information is automatically reproduced.

At the upper left of the display screen, as indicated by "Login: Takeshi", the user named "Takeshi" is in a logged-in state. Further, in the vicinity of the POI icon A and the POI icon B, an evaluation mark indicating the user evaluation for the POI is attached FIG. 8 is a view illustrating a smartphone usage screen example 2 according to this embodiment.

Figure 8:
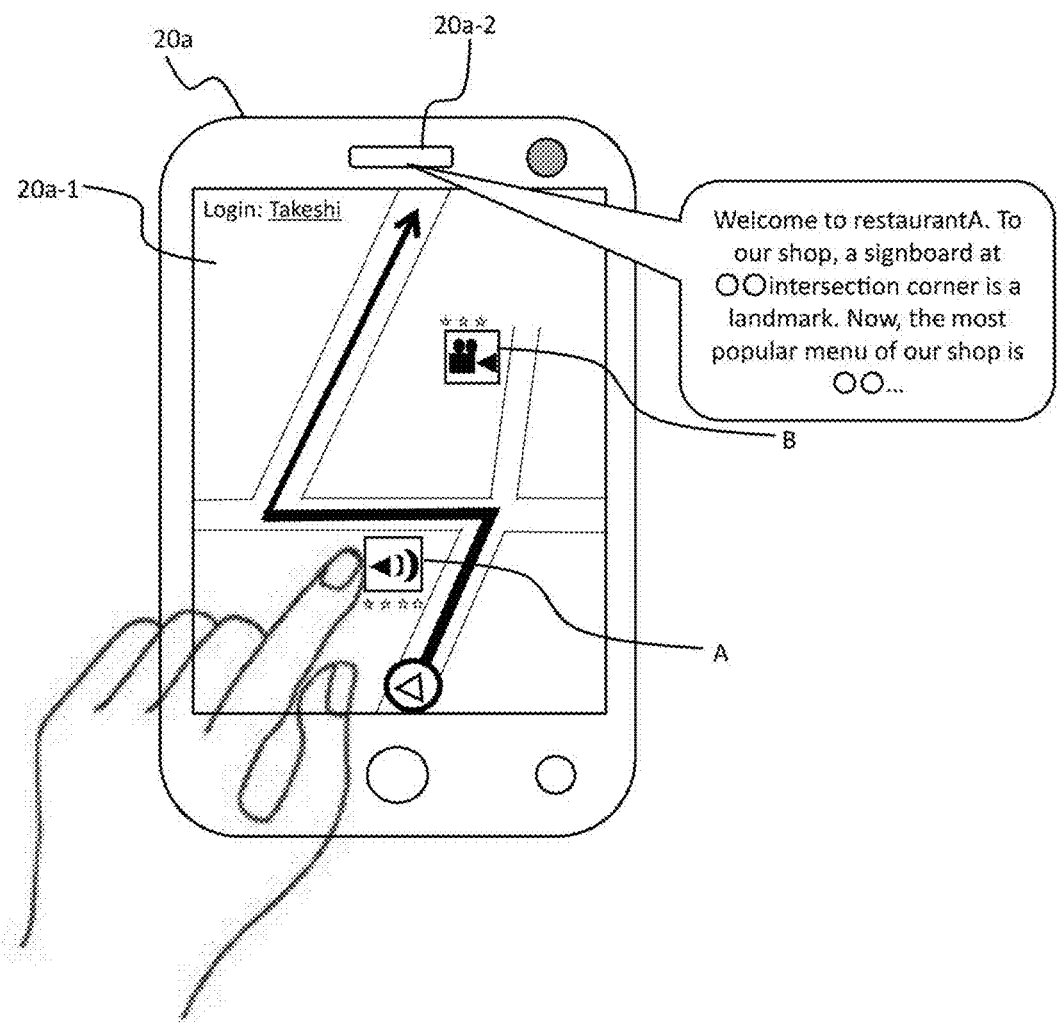
FIG. 8 is a view illustrating a smartphone usage screen example 2 according to the present embodiment.

For example, as illustrated in FIG. 8, when the user touches the POI icon A, the voice content (voice data) as the POI information is automatically reproduced. Specifically, from the speaker 20*a*-2, the voice to introduce this POI such as [Welcome, welcome to"Restaurant A". To our shop, white signboard of ○○ intersection corner is a landmark. "○○ . . . " is the most popular menu of our shop] is now output. As a result, the user can grasp the POI information of the POI icon A easily and in detail by merely touching the POI icon A without getting his/her hands off (for example, during driving).

Figure 9:
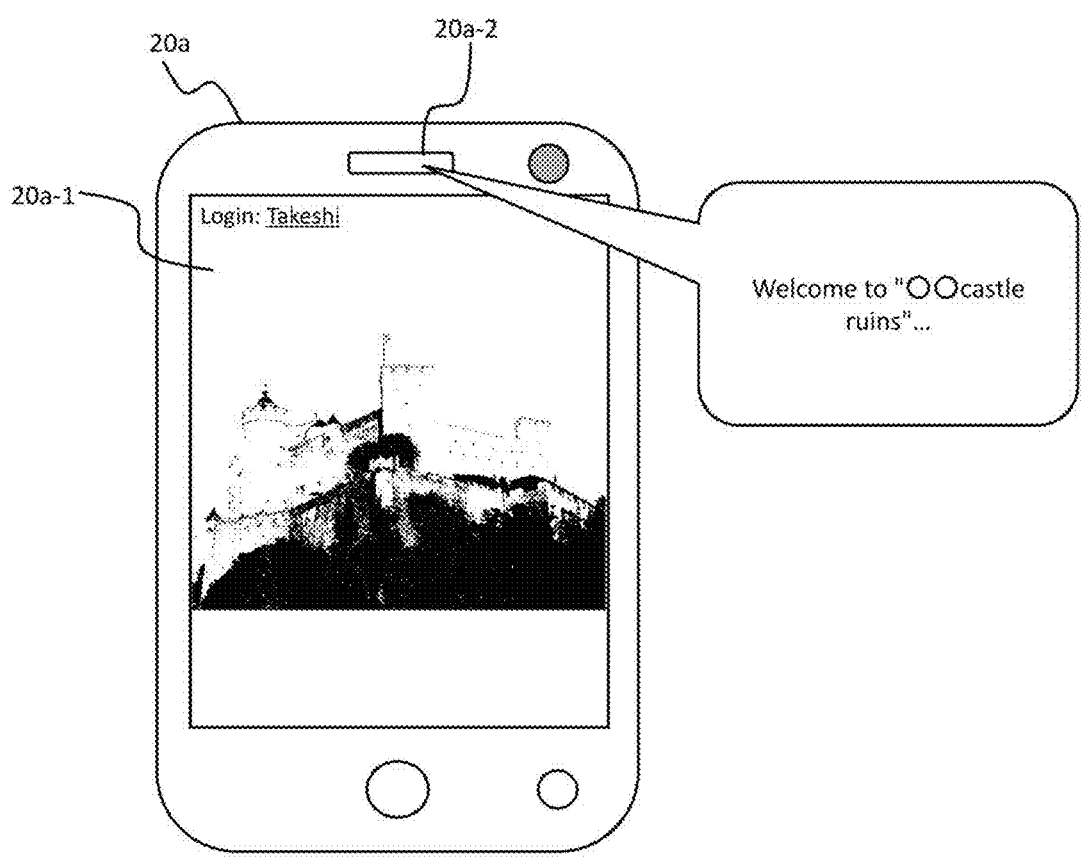
FIG. 9 is a view illustrating a smartphone usage screen example 3 according to the present embodiment.

FIG. 9 is a view illustrating a smartphone usage screen example 3 according to this embodiment.

For example, as illustrated in FIG. 9, when the user touches the POI icon B, the video content (video data) as the POI information is automatically reproduced. Specifically, on the display screen 20*a*-1, the video for introducing the present POI is displayed, and a voice such as [Welcome to "○○ Castle ruins" . . . ] is output from the speaker 20*a*-2. This allows the user to grasp the POI information of the POI icon B easily and in detail based on the video obtained by simply touching the POI icon B without getting his/her hands off (for example, during driving).

The voice contents (voice data) and the video content (video data) reproduced in FIGS. 8 and 9 are implemented in such that "registration data" in the POI information DB 104b is acquired from the navigation server 10 and reproduced on the navigation terminal 20.

Figure 10:
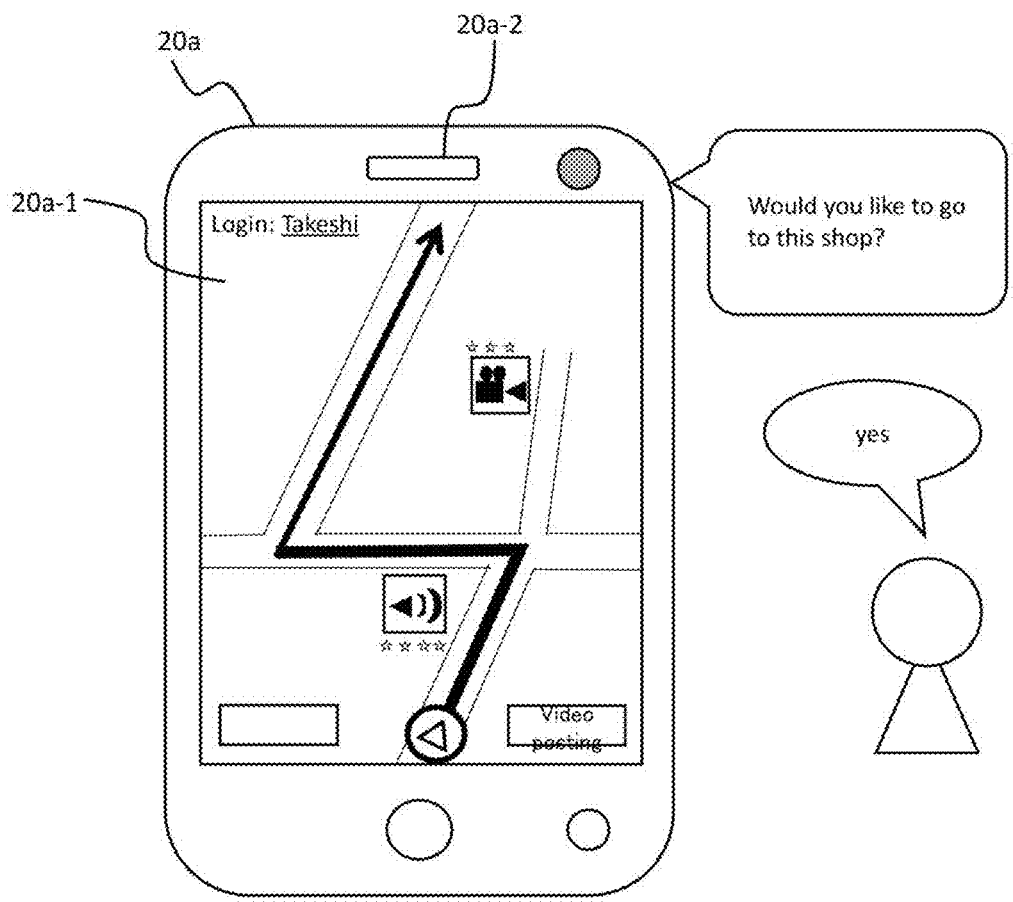
FIG. 10 is a view illustrating a smartphone usage screen example 4 according to the present embodiment.

FIG. 10 is a view illustrating a smartphone usage screen example 4 according to this embodiment.

Next, when the voice or video content of the POI ends (see FIGS. 8 and 9), a voice questionnaire for acquiring the user evaluation is executed. Specifically, since a voice such as "Would you like to enter in this shop?" is output from the speaker 20a-2 as the inquiry voice, so that the user responds to inquiry voice to input the user voice such as "yes" or "no" to the microphone 20a-3. The user voices are totalized after analysis by the post data registering unit 103, reflected on "evaluation" in the POI information DB 104b (see FIG. 5) and displayed as an evaluation mark in the vicinity of the POI icon (see FIG. 7). In addition, it is possible to prepare various contents for the inquiry voice, and a plurality of questionnaire contents may be prepared to enable the detailed evaluation by word of mouth.

In this way, since information of "evaluation" can be input by voice for voice content (voice data) and video content (video data), by summing up this information, it is possible to obtain information, that is to say a user evaluation, for each POI.

Figure 11:
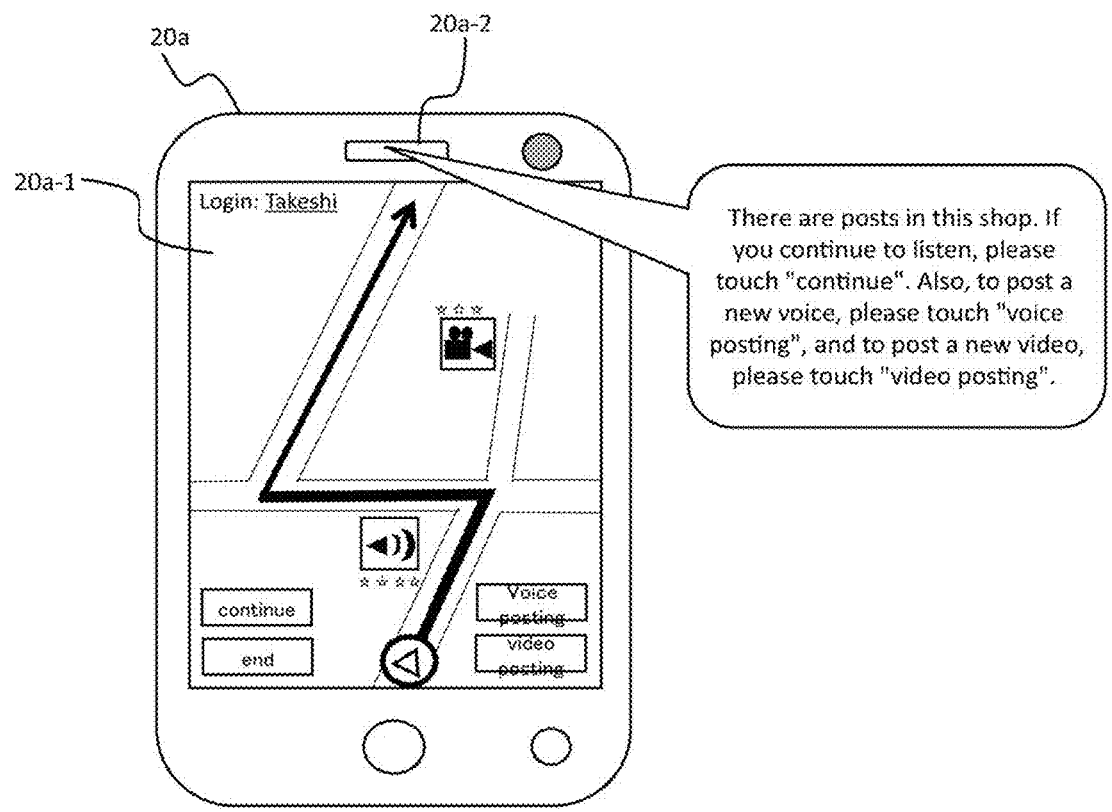
FIG. 11 is a view illustrating a smartphone usage screen example 5 according to the present embodiment.

FIG. 11 is a view illustrating a smartphone usage screen example 5 according to this embodiment.

Even if the voice or video content for introducing the POI is ended, if there is another voice or video content (voice data or video data) posted, these can be reproduced successively. Further, when the reproduction is completed, a voice questionnaire for acquiring the user evaluation value can be executed again.

On the other hand, the user can additionally post the voice data recorded or the video data captured by him/herself to this POI. By posting information that the user who has heard the voice or video content for introducing the POI still thinks necessary to be added or knowing information etc., as new voice data or video data, the information on the map is further enriched. Also, in the case of a natural facility or the like, even at the same spot, the scenery is totally different depending on the time and the time, such as a time when the sunset is beautiful, a time when the fog is deep, the scenery of heavy snow, etc. By enabling posting of multiple pieces of the video data, it is possible to communicate a changing state which can never be transmitted with only one piece of the video.

Specifically, from the speaker 20a-2, the voice such as ["There is a post(s) about this shop, please touch "Continue" if you want to continue. Also, to post a new voice, please touch "Voice posting", and to post new video, please touch "Video posting"] is outputted. The user selects "Continue", "Voice posting", "Video posting" or "End" according to the instruction.

Figure 12:
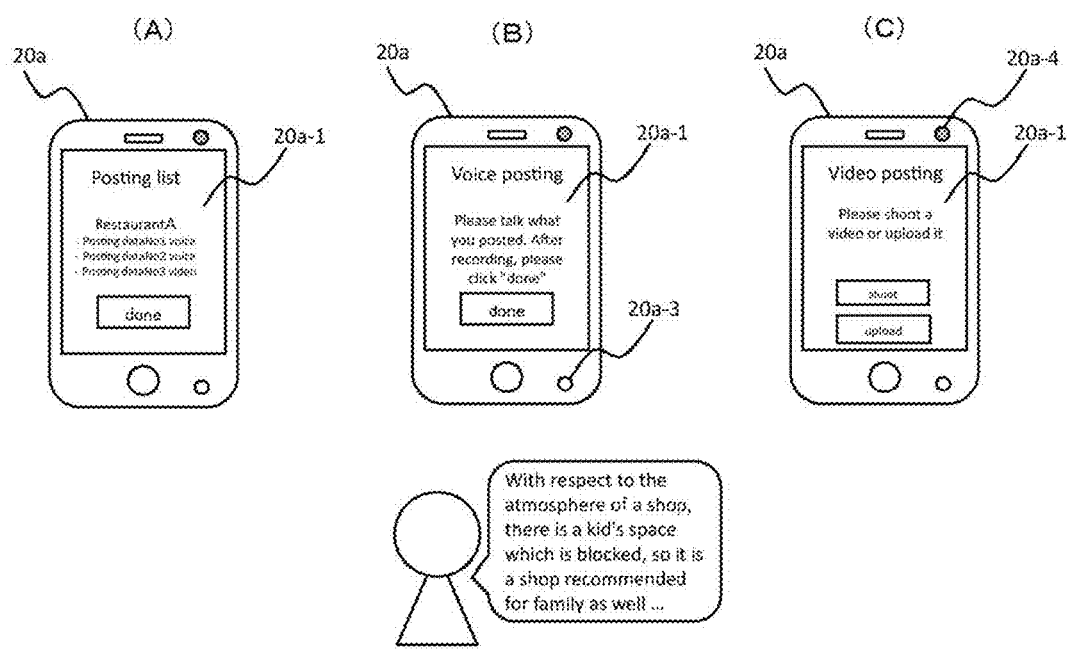
FIG. 12 is a view illustrating a smartphone usage screen example 6 according to the present embodiment.

FIG. 12 is a view illustrating a smartphone usage screen example 6 according to this embodiment.

When "continue" is touched, the process proceeds to the posting list screen illustrated in FIG. 12(A). When there are a plurality of pieces of post data in the POI information DB 104b, the pieces of post data are sequentially reproduced. Further, it is also possible to select arbitrary piece of the posted data by touch operation by the user. To finish the reproduction, the user touches "Done".

On the other hand, when "Post voice" is touched, the screen advances to the voice posting screen illustrated in FIG. 12(B). The user posts the voice data via the microphone 20a-3. For example, "With respect to the atmosphere of a shop, there is a kid's space which is blocked, so it is a shop recommended for family as well . . . ". After finishing the reproduction, the user touches "Done".

Meanwhile, when "Video posting" is touched, the screen advances to the video posting screen illustrated in FIG. 12(C). The user touches "shoot", activates the camera 20a-4, shoots the video in real time and posts the video as video data as it is. Or, if the video data that has already been captured exists, the user touches "Upload", selects the file and posts the selected file. After finishing posting the selected file, the user touches "Done". The publication range of the posted voice data and video data is in accordance with the value of "publication range" previously set by the posting user.

In addition, the owner or the like of the POI may distribute the electronic coupon ticket or the electronic coupon ticket to the user who posted the "post data" in order to promote the posting of the "post data". In this case, the navigation server 10 refers to the user DB (not illustrated) or the like in accordance with the operation of the owner or the like and sends an electronic coupon ticket or an electronic preferential ticket to the mail address of the user specified by the "posting user ID" who posted the "posted data".

Figure 13:
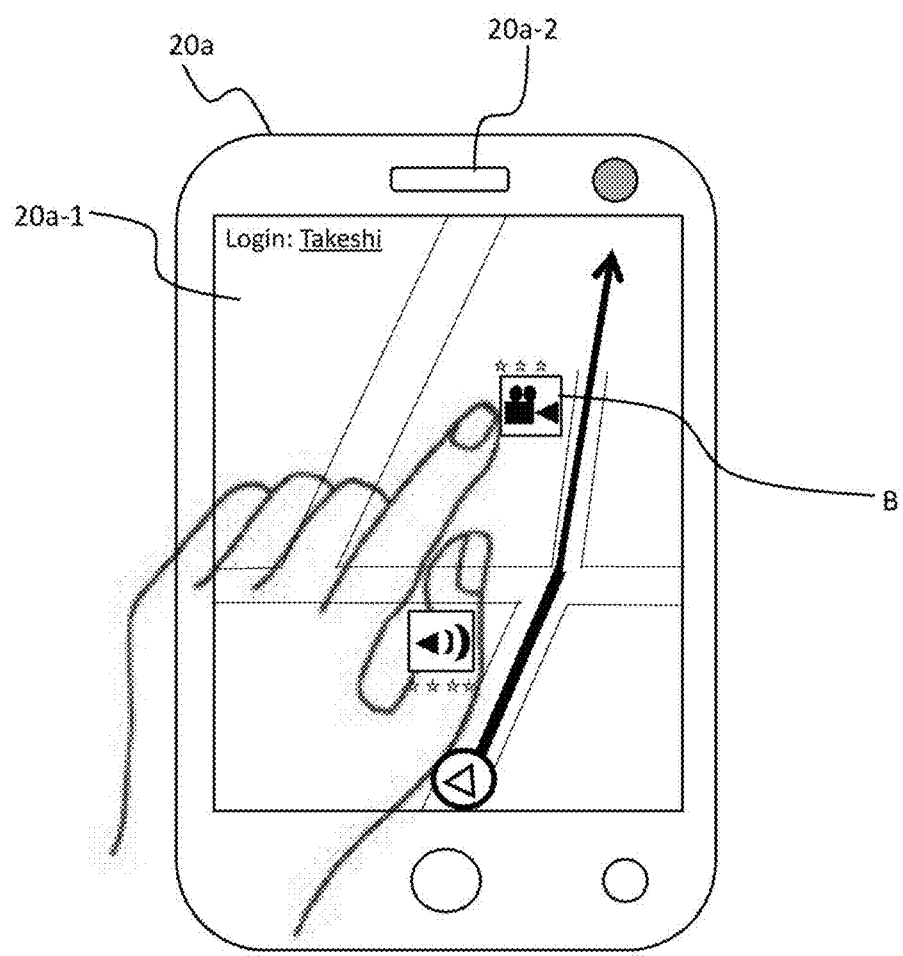
FIG. 13 is a view illustrating a smartphone usage screen example 7 according to the present embodiment.

FIG. 13 is a view illustrating a smartphone usage screen example 7 according to the present embodiment.

Here, as a result of the user viewing the video content (video data) of the POI icon B on the display screen, he/she is interested in "○○ castle ruins" and desires to stop by all means. In this case, the user performs a predetermined operation (for example, double touch etc.) different from the reproduction operation of the voice content (the above-described touch operation) on the POI icon B so that the navigation unit 101 re-searches and displays the search route including the POI icon B as a through place.

Comparing FIG. 13 with FIG. 7, the initial search route is changed, and the search route is displayed so that the POI icon B can be visited on the way to the destination. As described above, when the user is interested in touching the details of the POI found on the map by chance as a result of the user listening to or viewing the voice or video data of the POI icon, the user can meet new POIs he/she did not know and discover new attractions by changing the originally scheduled route with a simple operation and stopping by POI.

If the user does not perform the search route at the beginning, the navigation unit 101 searches for a search route with the POI icon B as the destination when the user performs a predetermined operation on the POI icon B.

<Information Processing>

Figure 14:
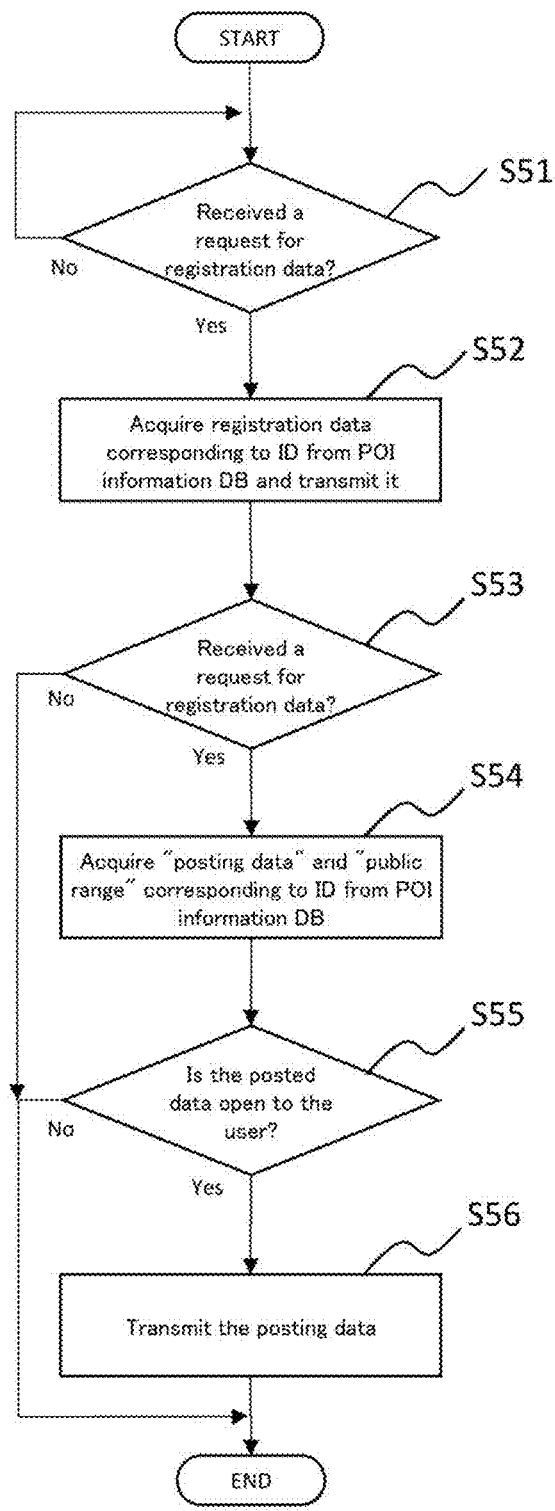
FIG. 14 is a flowchart illustrating reproduction processing of voice data and video data according to the present embodiment.

FIG. 14 is a flowchart illustrating reproduction processing of voice data and video data according to this embodiment.

S 51: The reproduction receiving unit 102 of the navigation server 10 determines whether the reproduction receiving unit 102 has received a request for registration data (reproduction request) from the reproducing unit 205 of the navigation terminal 20. The registration data is voice data or video data that has been initially registered by the owner or the like. The acquisition request of registration data includes, as parameters, the user ID of the user making the request and "ID" of the touched POI. Also, the request for acquisition of registered data is transmitted to the navigation server 10 from the navigation terminal 20, for example, when the user touches the POI icon on the map (see FIG. 8).

S 52: The reproduction receiving unit 102, when receiving the acquisition request for the registration data, refers to the POI information DB104b to acquire the "registration data" associated with "ID" and transmit (responds) the acquired data. Thus, on the display screen of the navigation terminal 20, the "registration data" is reproduced (see FIGS. 8 and 9).

S 53: Then, the reproduction receiving unit 102 determines whether the reproduction receiving unit 102 has received the acquisition request for post data (reproduction request) from the reproducing unit 205 of the navigation terminal 20. The post data is voice data or video data additionally registered by the general user other than the owner or the like. The acquisition request for post data includes, as parameters, the user ID of the user who made the request and "ID" of the touched POI. The acquisition request for post data is transmitted to the navigation server 10 from the navigation terminal 20 when the user touches the "Continue" (see FIG. 10).

S 54: The reproduction receiving unit 102, when receiving the acquisition request for post data, refers to the POI information DB 104b to obtain "Post Data", "Post User ID" and "disclosure range" corresponding to the "ID".

S 55: The reproduction receiving unit 102 determines based on the "disclosure range" acquired at S54, whether the acquired "Post Data" is published to the user performing the acquisition request for the posts data. Specific determination processing methods are, for example, as follows.

If "disclosure range" is 0 (unpublished), it is determined that the acquired "Post Data" is not published to the user who made the request for the posts data.

If "disclosure range" is 1 (published), it is determined that the acquired "Post Data" is published to the user performing the acquisition request for the posts data.

If "disclosure range" is 2 (private), refers to the user DB (not illustrated) or the like, the user identified by "Post User ID", and it is determined whether the user specified by the user ID acquired in S53 is set as a friend. If the user is set as a friend, it is determined that the acquired "Post data" is published to the user performing the acquisition request for the posts data. The information of the friends may be obtained in conjunction with other SNSs.

S 56: The reproduction receiving unit 102, if it is published, acquires the "Post Data" acquired in S54 and transmits (responds) the post data.

Figure 15:
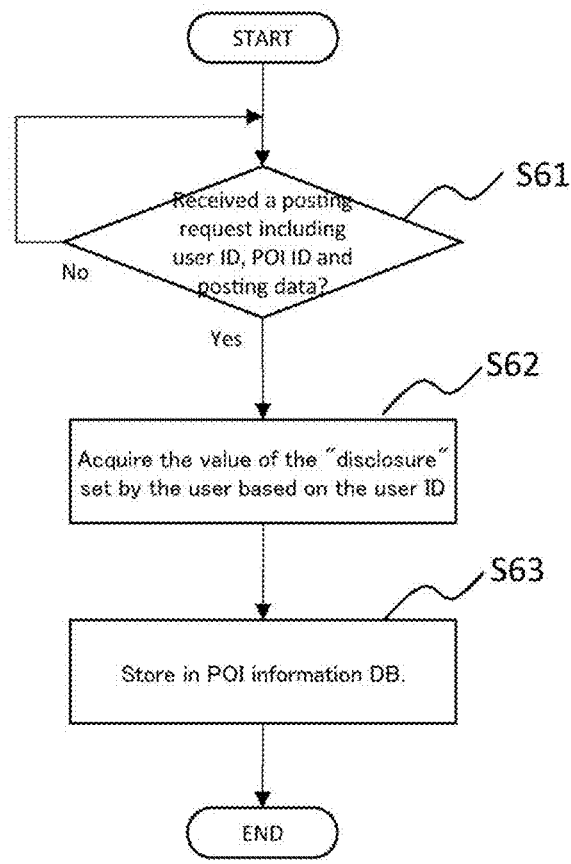
FIG. 15 is a flowchart illustrating posting processing of voice data and video data according to the present embodiment.

FIG. 15 is a flow diagram illustrating a post processing of the voice data and video data according to the present embodiment.

S 61: The post data registering unit 103 of the navigation server 10 determines whether a post request for the post data is received from the posting unit 207 of the navigation terminal 20. The post request for the post data includes, as parameters, the user ID of the user who made the request, "ID" of the POI, and the post data (voice data and video data).

S 62: The post data registering unit 103 acquires the value of in the case of receiving a post request for the post data, refers to the user DB (not illustrated) or the like to obtain the value of "disclosure range" the user has set on the basis of the user ID acquired in S61. The value of "disclosure range" may be 0, 1, or 2 as described above.

As described above, when the post user is in a logged-in state, the post registration part 103 acquires the user ID, and can obtain a value of "disclosure range" which is previously set by the user from the user DB (not illustrated) or the like. "Public range" represents the public a range of "post data", and the user sets for "disclosure range" as the default for the data that the users have posted, one of 0 (private), 1 (published), 2 (limitedly-published) so that the users can determine the disclosure range freely, such as very limited user, an unspecified number of users, friends, etc. Also, the user may set "private" at first, and change to "published" at a later date. Of course, the "disclosure range" in post data unit may be arbitrarily set.

S63: The post registration part 103 resisters the post data, which has been posted, in the "post data" in the POI information DB104b. Thus, in association with the POI, the data is stored in items "Post Data No" (numbering auto) "Post Data", "Post user ID", and "publication range".

<Summary>

As described above, according to the navigation system 100 of the present embodiment, since the user can reproduce the voice or video data simply by touching the POI icon on the display screen of the navigation terminal, without tied up (for example, while driving), it is possible to easily obtain detailed information about the shops and facilities in the vicinity. Also, if the user feels such information is insufficient, it is also possible for the user to additionally post the voice or video data and the user evaluation. This makes it possible to further enhance the detailed information about the shops and facilities in the vicinity. That is, according to an embodiment of the present invention, it becomes possible to easily grasp the detailed information about the POI on the map.

The preferred embodiments of the present invention, the invention has been described represents the specific embodiments without departing from the broader spirit and scope of the invention as defined in the appended claims, to these specific examples it is clear that it is possible to make various modifications and changes. That should not be construed as the present invention be limited by the details and the accompanying drawings of embodiments.

DESCRIPTION OF REFERENCE SYMBOLS

10 Navigation server
20 Navigation terminal
100 Navigation system
102 reproduction receiving unit
103 post data registering unit
104 storage unit
205 reproducing unit
206 voice/image recording unit
207 posting unit

The invention claimed is:

1. A navigation system configured to display a POI (Point Of Interest) icon on a map, the navigation system comprising:
a storage that stores POI information and voice data in association with each other; and
a processor configured to:
upon a selection of the POI icon displayed on the map, reproduce the voice data associated with the POI information of the POI icon;
record new voice data; and
cause the storage to store the POI information of the selected POI icon and the new voice data in association with each other, such that the new voice data thus stored in the storage is capable of being reproduced by the processor in association with the POI information of the selected POI icon,
wherein the processor, after completion of the reproduction, obtains a user voice in response to an inquiry voice, calculates an evaluation value based on an analysis of the user voice, and causes the storage to store the POI information of the selected POI icon and the evaluation value in association with each other.

2. The Navigation system according to claim 1, wherein the processor is further configured to perform a route search to a destination, and wherein the processor, after completion of the reproduction, upon a predetermined operation for the selected POI icon, performs the route search to said POI icon.

3. A navigation system configured to display a POI (Point Of Interest) icon on a map, the navigation system comprising:
   a storage that stores POI information and video data in association with each other; and
   a processor configured to:
      upon a selection of the POI icon displayed on the map, reproduce the video data associated with the POI information of the POI icon;
      record new video data; and
      cause the storage to store the POI information of the selected POI icon and the new video data in association with each other, such that the new video data thus stored in the storage is capable of being reproduced by the processor in association with the POI information of the selected POI icon,
   wherein the processor, after completion of the reproduction, obtains a user voice in response to an inquiry voice, calculates an evaluation value based on an analysis of the user voice, and causes the storage to store the POI information of the selected POI icon and the evaluation value in association with each other.

4. The Navigation system according to claim 3, wherein the processor is further configured to perform a route search to a destination, and wherein the processor, after completion of the reproduction, upon a predetermined operation for the selected POI icon, performs the route search to said POI icon.

5. A non-transitory computer-readable recording medium having stored therein a program for causing a computer to,
   upon a selection of a POI (Point Of Interest) icon displayed on a map, reproduce voice or video data associated with POI information of the POI icon, the POI information and the voice or video data being stored in a storage in association with each other;
   record new voice or video data; and
   cause the storage to store the POI information of the selected POI icon and the new voice or video data in association with each other, such that the new voice or video data thus stored in the storage is capable of being reproduced by the processor in association with the POI information of the selected POI icon,
   wherein the program further causes the computer to, after completion of the reproduction, obtain a user voice in response to an inquiry voice, calculate an evaluation value based on an analysis of the user voice, and cause the storage to store the POI information of the selected POI icon and the evaluation value in association with each other.

* * * * *